US012063137B2

(12) United States Patent (10) Patent No.: US 12,063,137 B2
Patchava et al. (45) Date of Patent: Aug. 13, 2024

(54) HYBRID ORTHOGONAL FREQUENCY DIVISION MULTIPLEXING

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/643,540

(22) Filed: Dec. 9, 2021

(65) Prior Publication Data

US 2023/0188404 A1 Jun. 15, 2023

(51) Int. Cl.
*H04L 27/26* (2006.01)
*H04L 5/00* (2006.01)

(52) U.S. Cl.
CPC ........ *H04L 27/2697* (2013.01); *H04L 5/0007* (2013.01); *H04L 27/2636* (2013.01)

(58) Field of Classification Search
None
See application file for complete search history.

(56) References Cited

U.S. PATENT DOCUMENTS

2019/0173630 A1* 6/2019 Kons ............... H04L 5/0037
2022/0393921 A1* 12/2022 Pfadler ............ H04L 25/0224
2023/0164013 A1* 5/2023 Kons ............... H04L 27/26532

OTHER PUBLICATIONS

Meridian Systems: "Multiplexing OTFS Waveform with OFDM for PDCCH and PDSCH", San Diego, Sep. 2021, pp. 1-10.
R. Hadani et al., "Orthogonal Time Frequency Space Modulation", arXiv: 1808.00519v1 [cs.IT] Aug. 1, 2018.

* cited by examiner

*Primary Examiner* — Christine T Duong
(74) *Attorney, Agent, or Firm* — Patterson + Sheridan, LLP

(57) ABSTRACT

Certain aspects of the present disclosure provide techniques for hybrid modulation and demodulation, which may include multiplexing and demultiplexing different waveform types. An example method includes receiving a time-domain waveform from a transmitting entity and converting the time-domain waveform to a frequency domain. The method also includes identifying a first set of time and frequency resources associated with converted first information and a second set of time and frequency resources associated with second information in time and frequency resources of an orthogonal frequency domain multiplexing (OFDM) resource grid in a time-frequency domain. The method further includes decoding the first set of time and frequency resources to generate first information from the converted first information. For certain aspects, the first information may be precoded with an orthogonal time frequency space (OTFS) modulation.

26 Claims, 13 Drawing Sheets

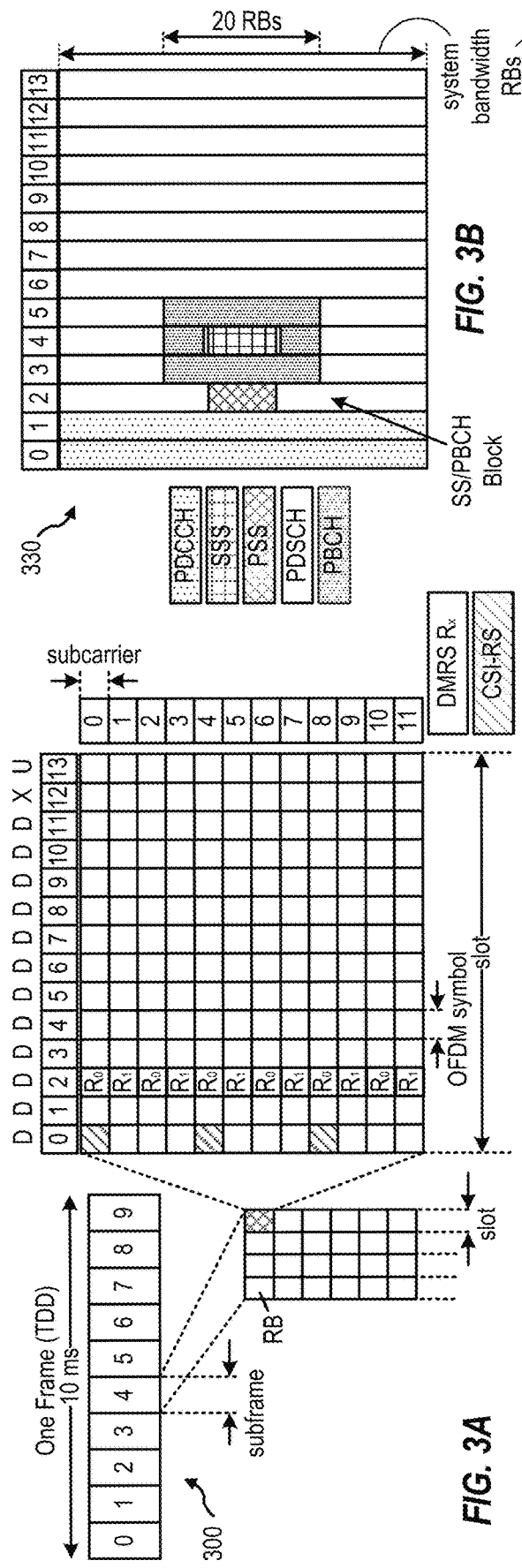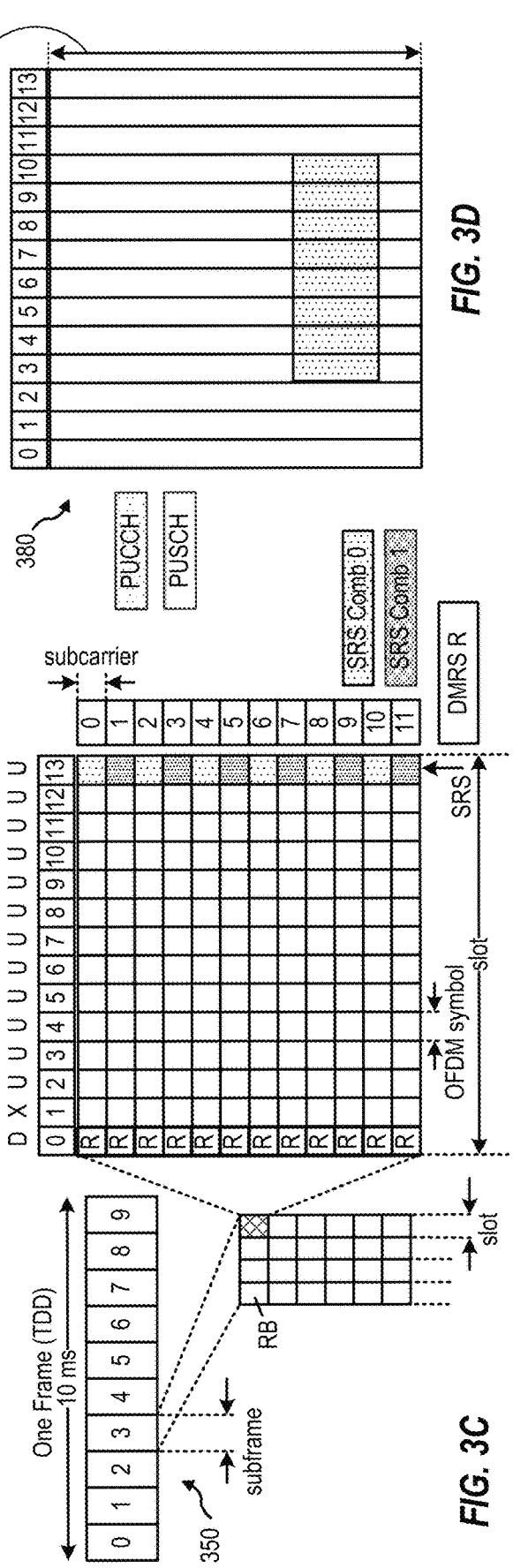

HYBRID ORTHOGONAL FREQUENCY DIVISION MULTIPLEXING

INTRODUCTION

Aspects of the present disclosure relate to wireless communications, and more particularly, to techniques for orthogonal frequency division multiplexing.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a transmitter. The method generally includes converting first information in a delay-Doppler domain to a time-frequency domain and mapping second information and the converted first information to time and frequency resources of an orthogonal frequency domain multiplexing (OFDM) resource grid in the time-frequency domain. The method also includes generating a time-domain waveform based on the OFDM resource grid and transmitting the time-domain waveform.

One aspect provides a method for wireless communication by a transmitter. The method generally includes receiving a time-domain waveform from a transmitting entity and converting the time-domain waveform to a frequency domain. The method also includes identifying a first set of time and frequency resources associated with converted first information and a second set of time and frequency resources associated with second information in time and frequency resources of an orthogonal frequency domain multiplexing (OFDM) resource grid in a time-frequency domain. The method further includes decoding the first set of time and frequency resources to generate first information from the converted first information.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
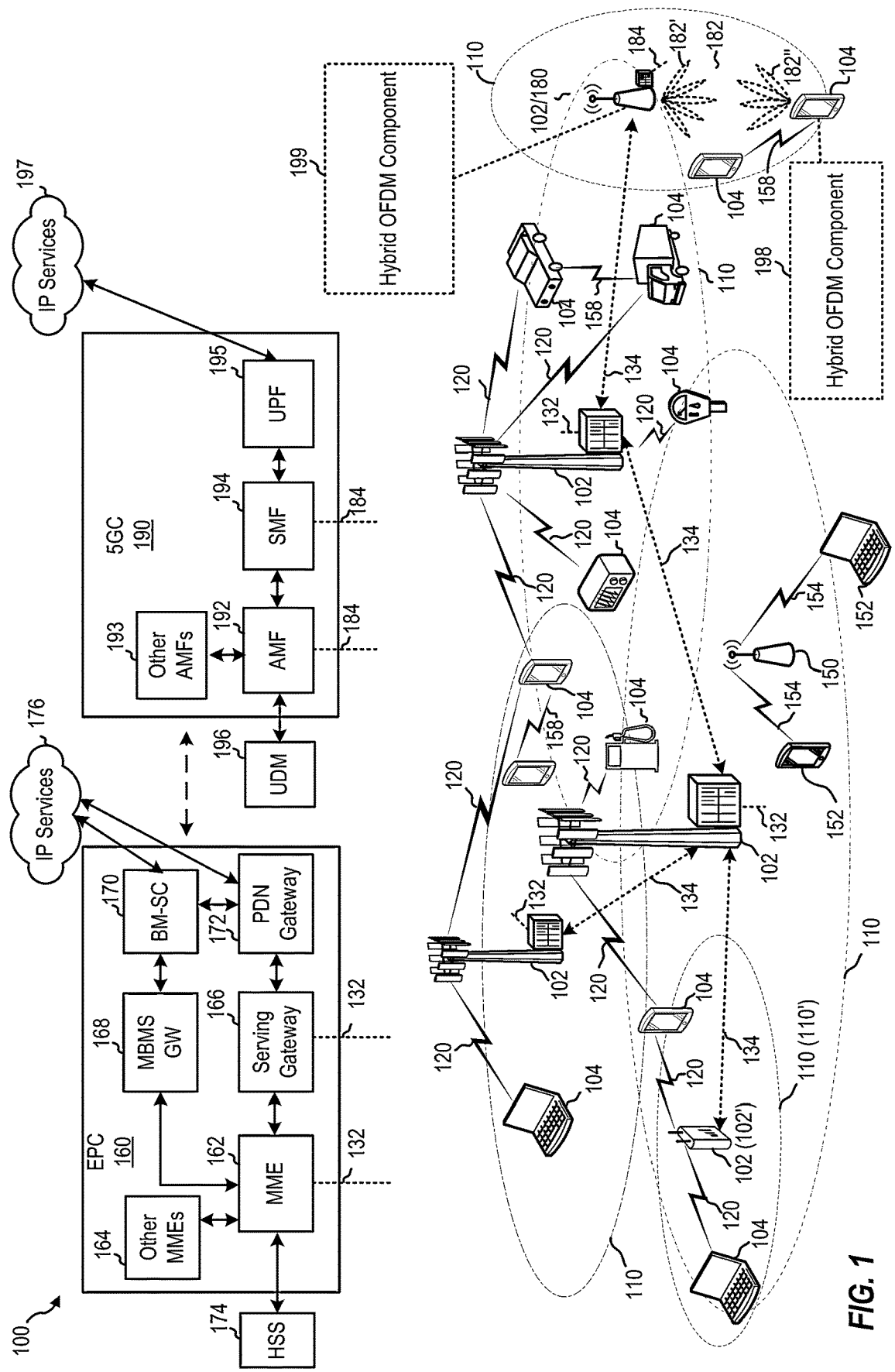
FIG. 1 is a block diagram conceptually illustrating an example wireless communication network.

Aspects of the present disclosure provide apparatuses, methods, processing systems, and computer-readable mediums for modulation and demodulation, such as multiplexing different waveform types.

In a wireless communication network, some wireless devices (e.g., user equipment) may experience greater frequency shifts and/or a greater spread of frequency shifts due to the Doppler effect than other wireless devices. For example, wireless devices on a high speed train (HST) (or other high mobility vehicles) may encounter greater frequency shifts compared to other wireless devices, such as lower mobility or static (stationary or immobile) devices, in the same cell coverage. In cases where multiple transmit-receive points (TRPs) provide wireless coverage, the wireless devices on a HST may experience a wide spread of Doppler shifts, which may lead to inter-carrier interference (ICI) for the wireless devices. An orthogonal frequency-division multiplexing (OFDM) modulation scheme may be sensitive to Doppler effects, such as the frequency shifts and frequency spreads encountered by wireless devices in high mobility scenarios (e.g., HSTs or other high speed methods of transportation). In certain cases, the Doppler effects may degrade the performance of wireless communications using an OFDM modulation scheme, for example, due to inter-carrier interference from Doppler spreading.

Aspects of the present disclosure provide methods and apparatus for performing hybrid OFDM, for example, using a combination of orthogonal time frequency space (OTFS) modulation and OFDM modulation. Certain information (e.g., information for the high mobility devices) may be modulated in a delay-Doppler domain using the OTFS modulation. The OTFS-modulated information may be mapped (e.g., multiplexed) in frequency-time resources with other information (e.g., information for lower mobility or static devices) for transmission using OFDM modulation. A receiver may perform OTFS decoding on the information modulated in the delay-Doppler domain, which may provide improved means for channel estimation in a Doppler spreading channel compared to an OFDM-only based modulation scheme.

The hybrid OFDM described herein may provide desirable wireless communication performance, for example, in scenarios where high mobility and low mobility or static devices are in the same coverage area. The OTFS modulation component may facilitate time-varying channel estimation in channels with Doppler spreading, which may be encountered by the high mobility devices. With only OFDM-based modulation, it may be difficult for high mobility devices to estimate and compensate, or at least adjust, for ICI due to Doppler spreading, whereas for the OTFS component of the hybrid OFDM, the ICI may be converted to phase shifts, which may provide an uncomplicated means for ICI estimation and compensation for the devices encountering Doppler spreading. The OTFS component may provide a lower block error rate, for example, when the modulation and coding rate is higher due to the diversity in the OTFS component being from the channel, whereas OFDM-only modulation relies on the coding for diversity. The OTFS component may provide a desirable peak-to-average power ratio (PAPR).

As used herein, a high mobility wireless device may refer to a wireless communication device moving at a greater speed or velocity compared to another wireless device in a wireless communication network or cell. Similarly, a low mobility wireless device may refer to a wireless communication device moving at a lower speed or velocity compared to another wireless device in a wireless communication network or cell. As such, the terms high and low mobility may be relative to one another.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes a hybrid OFDM component 199, which may be configured to use a combination of OTFS modulation and OFDM modulation for certain information. Wireless communication network 100 further includes a hybrid OFDM component 198, which may be used configured to use OTFS demodulation and OFDM demodulation for certain information.

Figure 2:
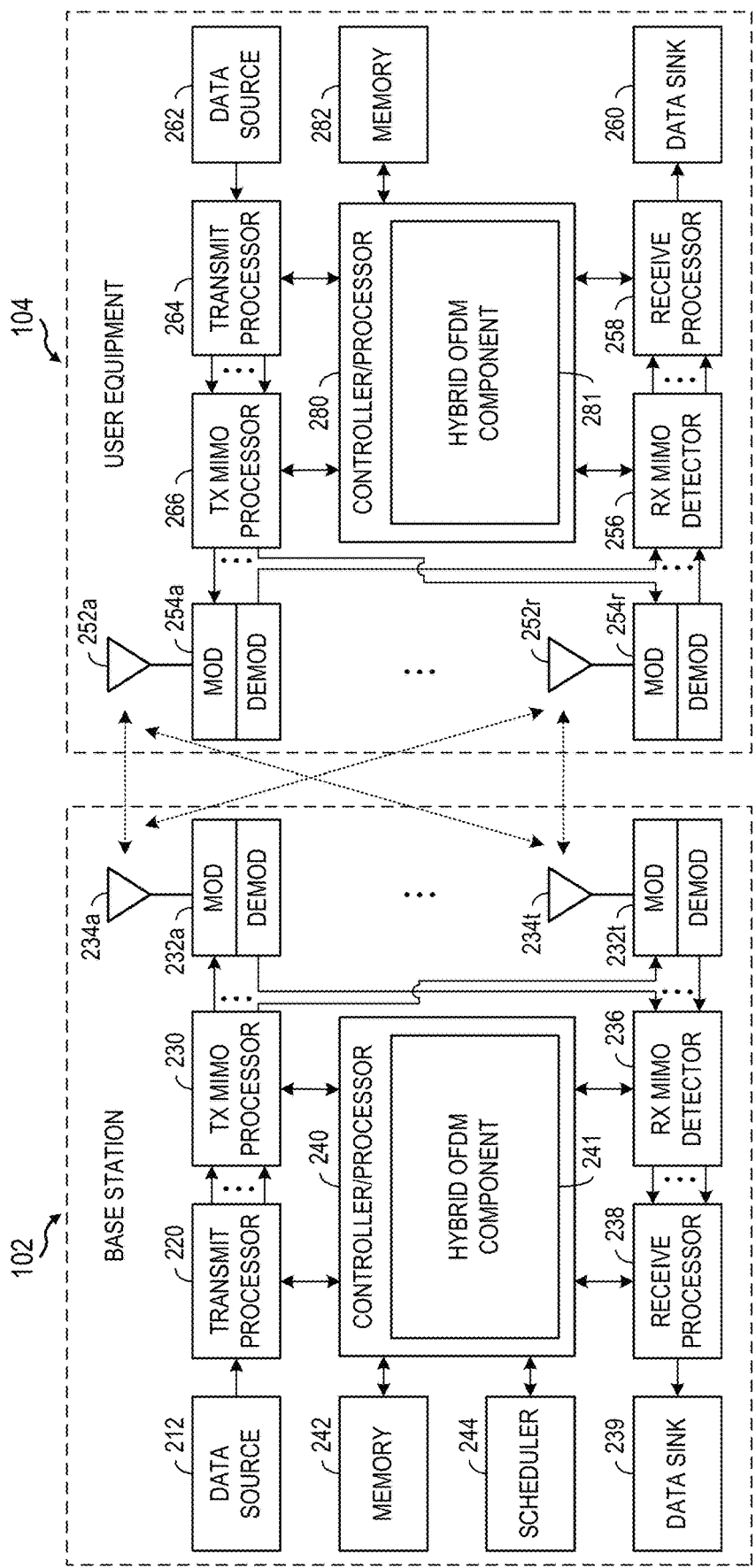
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a hybrid OFDM component 241, which may be representative of the hybrid OFDM component 199 of FIG. 1. Notably, while depicted as an aspect of controller/processor 240, a hybrid OFDM component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes a hybrid OFDM component 281, which may be representative of the hybrid OFDM component 198 of FIG. 1. Notably, while depicted as an aspect of controller/processor 280, the hybrid OFDM component 281 may be implemented additionally or alternatively in various other aspects of UE 104 in other implementations.

While the user equipment 104 is described with respect to FIGS. 1 and 2 as communicating with a base station and/or within a network, the user equipment 104 may be configured to communicate directly with/transmit directly to another user equipment 104, or with/to another wireless device without relaying communications through a network. In some aspects, the base station 102 illustrated in FIG. 2 and described above is an example of another user equipment 104. In certain aspects, the user equipment 104 illustrated in FIG. 2 and described above is an example of another base station 102.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, the hybrid OFDM may be used in mmWave bands.

Aspects Related to Hybrid OFDM

Aspects of the present disclosure provide methods and apparatus for performing hybrid OFDM, for example, using a combination of orthogonal time frequency space (OTFS) modulation and orthogonal frequency-division multiplexing (OFDM). Certain information (e.g., information for the high mobility devices) may be modulated in a delay-Doppler domain using the OTFS modulation. The OTFS-modulated information may be mapped (e.g., multiplexed) in frequency-time resources with other information (e.g., information for lower mobility or static devices) for transmission using OFDM modulation. A receiver may perform OTFS decoding on the information modulated in the delay-Doppler domain, which may provide improved means for channel estimation in a Doppler spreading channel compared to an OFDM-only-based modulation scheme.

The hybrid OFDM operations described herein may be suited for receivers that can facilitate additional receiver complexity, for example, due to certain processing complexities associated with the OTFS component, such as detection complexity and/or data block processing of the OTFS component. The OTFS component may have a higher detection complexity, for example, due to the OTFS operations using a joint detector for de-convolution. As a data block (e.g., multiple symbols of data) is modulated in the delay-Doppler domain at the transmitter, the receiver may process the entire OTFS-modulated data block for decoding, rather than symbol-by-symbol decoding. Such a scheme may use an additional buffer and/or data block detection at the receiver to decode the OTFS-modulated data.

Figure 4:
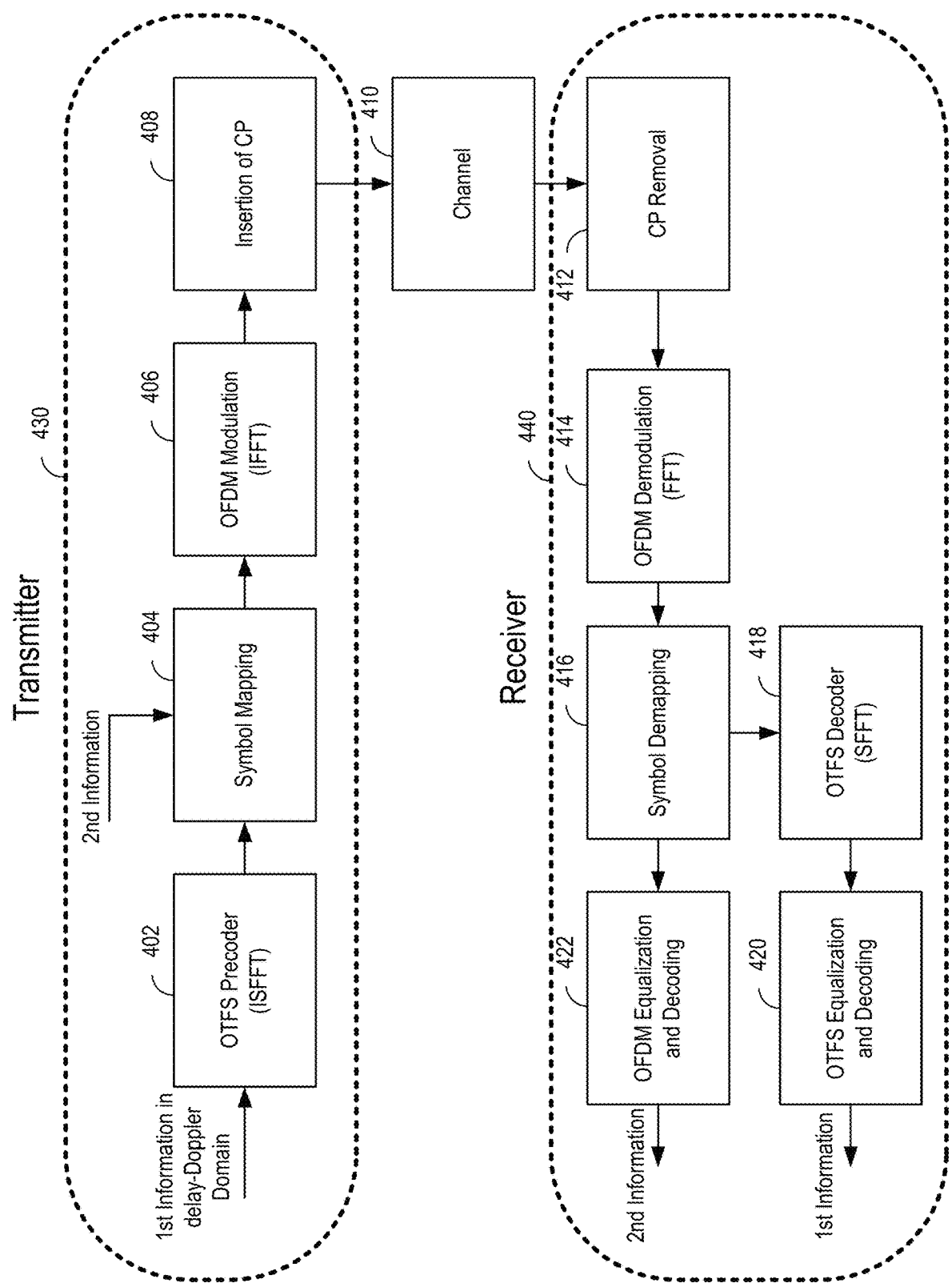
FIG. 4 is a diagram illustrating an example of hybrid OFDM logic at a transmitter and hybrid OFDM logic at a receiver.

FIG. 4 is a diagram illustrating an example of hybrid OFDM logic at a transmitter 430 (e.g., the BS 102) and hybrid OFDM logic at a receiver 440 (e.g., the UE 104). In certain aspects, the receiver 440 may be a wireless communication device capable of handling the receiver complexity for the hybrid demodulation. For example, the receiver may be a customer-premises equipment, as described herein with respect to FIG. 8.

Figure 5:
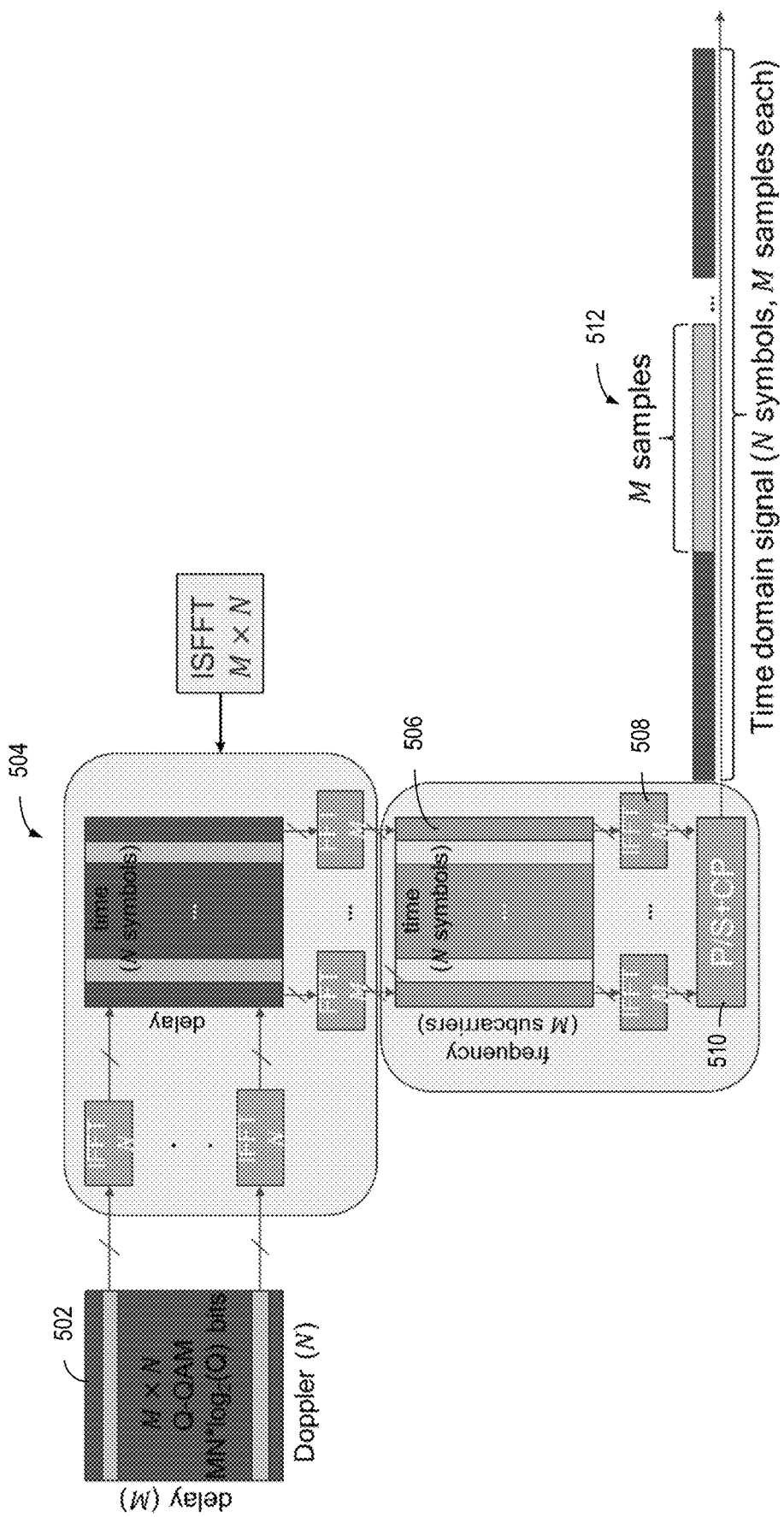
FIG. 5 is a diagram illustrating an example of orthogonal time frequency space processing.

At block 402, the transmitter 430 may apply an OTFS precoder to (e.g., an inverse symplectic finite Fourier transform (ISFFT)) to first information in a delay-Doppler domain. The first information may include information specific to a type of wireless device, such as one or more high mobility wireless devices, and/or information for a specific type of channel, such as a control channel. The OTFS modulation may be considered an ISFFT precoder applied to the first information. The OTFS precoder may convert the first information in the delay-Doppler domain to a time-frequency domain for OFDM processing. The OTFS precoder may be applied to a block of information, for example, N consecutive OFDM symbols. The converted first information may be determined using an ISFFT (e.g., a 2-dimensional FFT) as follows:

$$X[n, m] = \frac{1}{\sqrt{NM}} \sum_{k=0}^{N-1} \sum_{l=0}^{M-1} x[k, l] e^{j2\pi\left(\frac{nk}{N} - \frac{ml}{M}\right)}$$

where x[k, l] is representative of the first information in the delay-Doppler domain, N is the number of OFDM symbols in the first information, and M is the number of subcarriers in the bandwidth allocated for the first information. Each symbol in the first information may occupy the entire time and bandwidth due to the ISFFT. The ISFFT may use an inverse fast Fourier transform (IFFT) in the Doppler domain and a fast Fourier transform (FFT) in the delay domain, for example, as depicted in FIG. 5.

Figure 6:
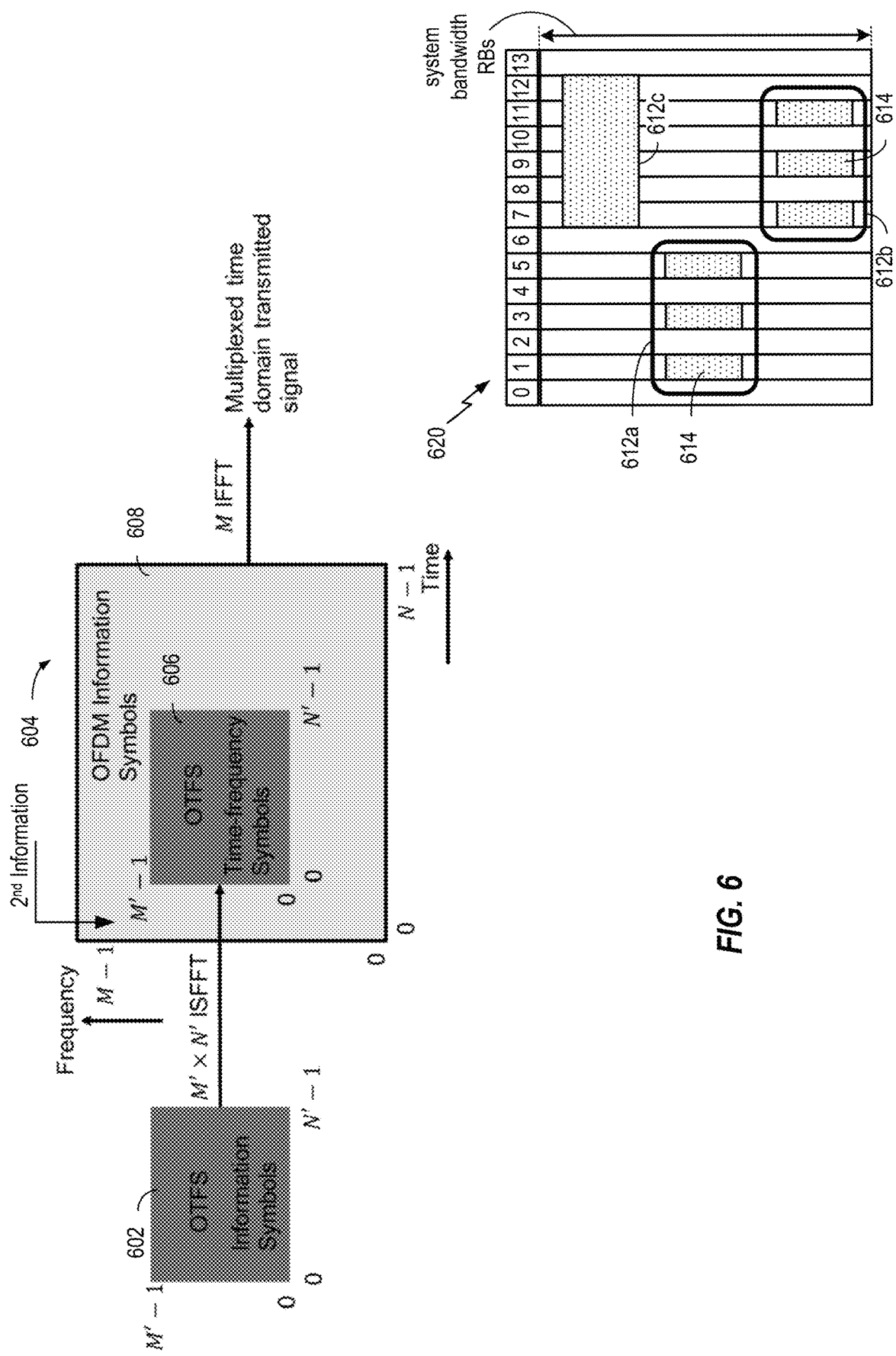
FIG. 6 is a diagram illustrating an example of hybrid OFDM operations with mapping of information in the time-frequency domain.

At block 404, the transmitter 430 may perform symbol mapping of second information and the converted first information, for example, as further described herein with respect to FIG. 6. The second information may include information for a specific type of wireless device, such as one or more low mobility wireless devices, and/or information for a specific type of channel, such as a data channel. As an example, the transmitter 430 may identify a first set of time and frequency resources for the converted first information and a second set of time and frequency resources for the second information in an OFDM resource grid (e.g., the resource grid depicted in FIG. 3A).

At block 406, the transmitter 430 may perform OFDM modulation, for example, using an inverse fast Fourier transform (IFFT). For example, the transmitter may apply the IFFT on the frequency components to generate a time-domain waveform.

At block 408, the transmitter 430 may insert a cyclic prefix in each of the OFDM symbols. The cyclic prefix may provide a guard interval between symbols to eliminate inter-symbol interference. The cyclic prefix may enable channel estimation using circular convolution.

At block 410, the transmitter 430 may transmit the time-domain waveform with the cyclic prefixes via a channel. For example, the transmitter 430 may transmit the time-domain waveform, which may carry the second information and the converted first information in frequency-division multiplexed (FDM) resources. The transmitter 430 may transmit the first set of time and frequency resources for the converted first information and the second set of time and frequency resources for the second information. In certain cases, the first set of time and frequency resources may overlap in time with the second set of time and frequency resources.

At block 412, the receiver 440 may receive the time-domain waveform and remove the cyclic prefix from each of the symbols in the time-domain waveform.

At block 414, the receiver 440 may perform OFDM demodulation, for example, using a FFT to transform the time-domain waveform into frequency-domain symbols.

At block 416, the receiver 440 may perform symbol demapping between the first information and the second information. For example, the receiver 440 may identify the first set of time and frequency resources associated with the converted first information and the second set of time and frequency resources associated with the second information the OFDM.

At block 418, the receiver 440 may apply an OTFS decoder on the first set of time and frequency resources, for example, using a symplectic finite Fourier transform (SFFT). The OTFS decoder may convert the first set of time and frequency resources from the frequency-time domain to the first information in the delay-Doppler domain.

At block 420, the receiver 440 may perform OTFS equalization and decoding on the OTFS output from the OTFS decoder, for example, using a joint equalizer. The receiver 440 may decode the OTFS output to generate the first information. In the delay-Doppler domain, the receiver 440 may perform channel estimation using phase shifts to compensate for ICI, for example. The OTFS processing may be performed in blocks of symbols, such as the N symbols of the first information. The OTFS component may facilitate improved wireless performance for high mobility devices, for example, due to the improved channel estimation/compensation of Doppler spreading.

At block 422, the receiver 440 may perform OFDM equalization and decoding on the second set of time and frequency resources. For example, the receiver 440 may use single-tap equalization for the OFDM symbols of the second set of time and frequency resources. The OFDM processing may be performed on a symbol-by-symbol basis.

The hybrid OFDM operations may be implemented as software components that are executed and run on one or more processors (e.g., controller/processor 280 or 240 of FIG. 2) of the corresponding transmitter or receiver.

FIG. 5 is a diagram illustrating an orthogonal time frequency space processing. In this example, information 502 may be representative of information (e.g., quadrature amplitude modulation (QAM) bits) modulated in a delay-Doppler domain, for example, using an OTFS modulation. The information 502 may have M×N information symbols. At activity 504, the delay-Doppler information 502 may be converted to a time-frequency domain using an ISFFT to generate converted information 506. The converted information may be multiplexed into an OFDM resource grid, for example, with other information. The converted information 506 may be mapped to time-frequency resources in the OFDM resource grid, for example, as further described herein with respect to FIG. 6. At activity 508, the converted information 506 may be converted from the time-frequency domain to the time-domain, for example using an IFFT. At activity 510, the parallel time-domain output from the IFFT may be serialized, and a cyclic prefix (CP) may be added to each symbol, such that a time-domain waveform 512 may be formed for transmission.

FIG. 6 is a diagram illustrating an example of hybrid OFDM operations with mapping of first information 602 and second information in frequency-time resources in an OFDM resource grid 604. In this example, the first information 602 may be representative of information modulated in a delay-Doppler domain, and the first information 602 may include M'×N' information symbols. The first information 602 is converted to the time-frequency domain using an ISFFT, and the converted first information is mapped to a first set of time and frequency resources 606 in the resource grid 604. The second information is mapped to a second set of time and frequency resources 608 in the resource grid 604. In this example, there may be no guard bands between the first and second sets of time and frequency resources 606, 608.

In certain cases, the converted first information may be mapped to continuous or discontinuous frequency resources and/or continuous or discontinuous time resources. For example, the resource grid 620 illustrates example time-frequency resource arrangements 612a-c for the converted first information. In the first arrangement 612a, the converted first information may be mapped to resources 614 with discontinuous time resources, for example, such that there is the same gap duration (e.g., a symbol) between the resources 614. In the second arrangement 612b, the converted first information may be mapped to different frequency resources from the first arrangement 612a. In the third arrangement 612c, the converted first information may be mapped in a block of time and frequency resources with continuous time and frequency resources. The converted first information may be mapped to continuous frequency resources to avoid ICI between OFDM and OTFS resources.

Figure 7:
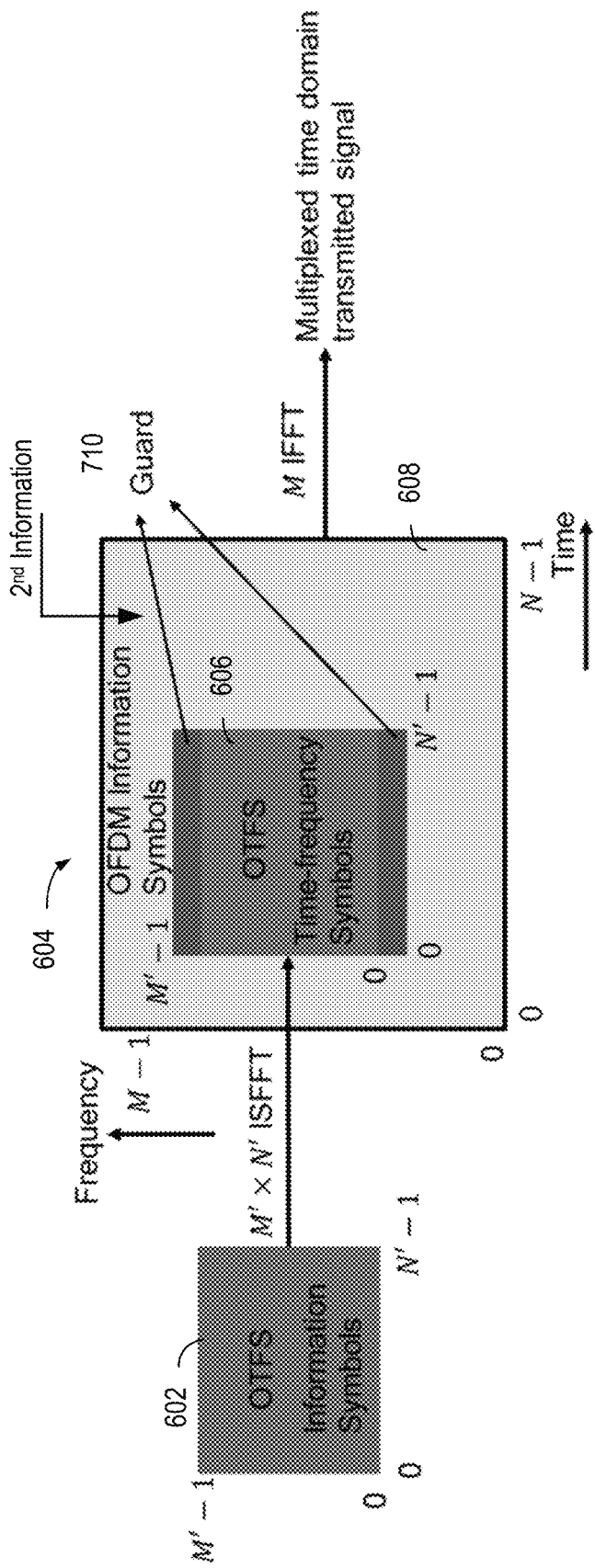
FIG. 7 is a diagram illustrating an example of resource mapping with guard bands arranged between resources for first and second information.

In certain aspects, one or more guard bands (or guard sub-carriers) may be arranged between the resources for the first and second information. For example, FIG. 7 is a diagram illustrating an example of resource mapping with one or more guard bands arranged between the resources for the first and second information. As shown, guard bands 710 may be arranged to separate frequencies between the first and second sets of time and frequency resources 606, 608 and, as such, may be referred to as "frequency guard bands." The guard bands 710 may be arranged on one or both frequency edges of the first set of time and frequency resources 606. The number of guard subcarriers or bands used for each of the guard bands 710 may be determined based on the Doppler-to-sub-carrier-spacing ratio. The guard bands 702 may carry certain information, such as a specific value (e.g., zeroes) or a cyclic prefix of the converted first information.

For certain aspects, the hybrid OFDM described herein may be used for certain types of wireless devices. For example, the OTFS component may be used for devices experiencing Doppler spreading, such as high mobility devices, and the OFDM component may be used for other devices, such as low mobility or static devices.

Figure 8:
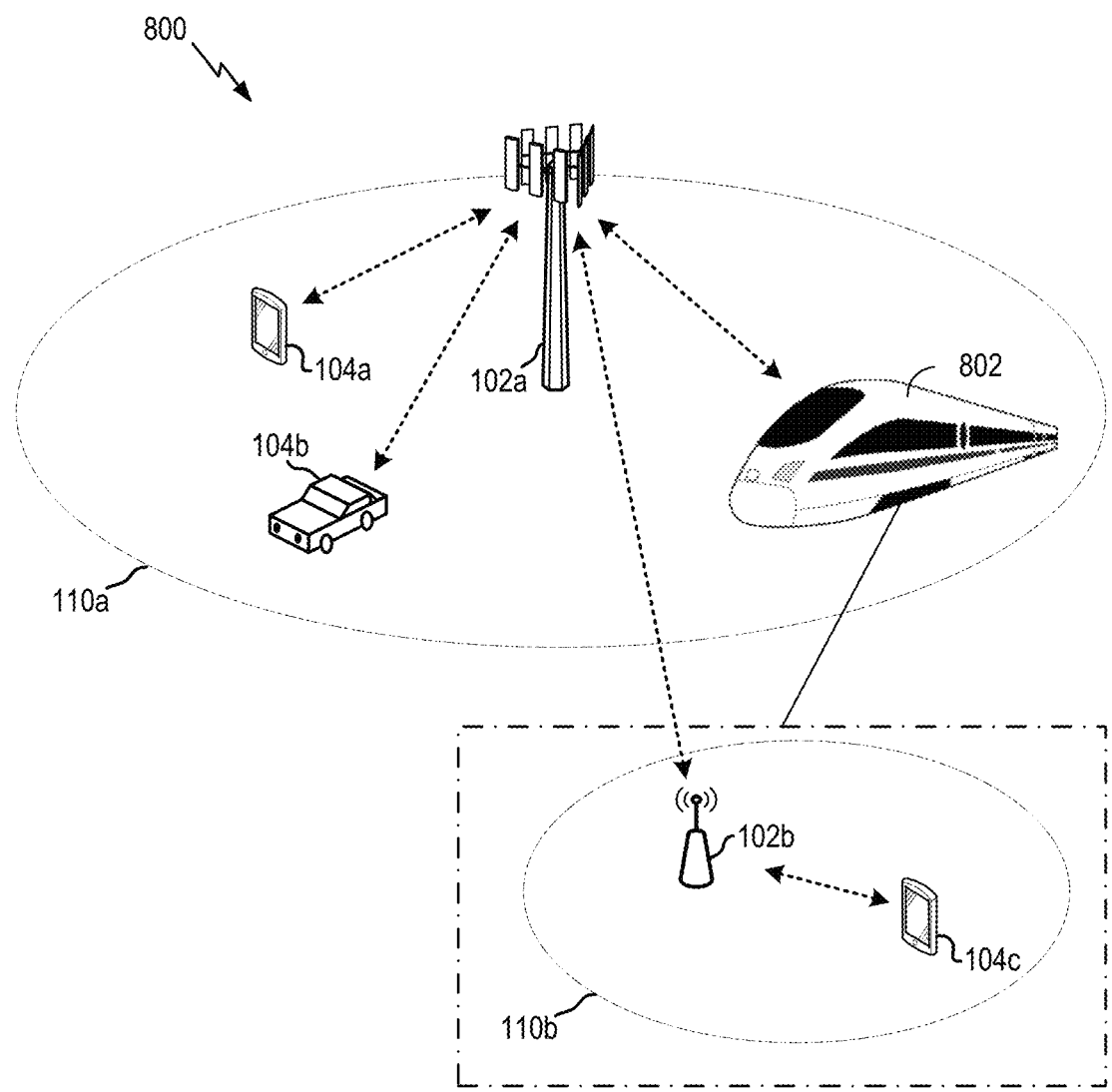
FIG. 8 is a diagram illustrating an example wireless communication network with different types of wireless devices.

FIG. 8 is a diagram illustrating an example wireless communication network 800 with different types of wireless devices. In this example, a first BS 102a may provide a first coverage area 110a, which may provide wireless coverage to a first UE 104a and a second UE 104b. The first UE 104a may be a low mobility or static wireless device, whereas the second UE 104b may be a high mobility wireless device. For example, the second UE 104b may be integrated with an automobile or a separate wireless device inside the automobile. It will be appreciated that the automobile is an example, and other types of vehicles may provide high mobility to a wireless device.

In certain cases, a train 802 (e.g., a HST) or other high speed vehicles may be in the first coverage area 110a of the first BS 102a. A second BS 102b may be located in (or integrated with, or deployed on) the train 802 and in communication with the first BS 102a, such that the second BS 102b provides a second coverage area 110b for other UEs (e.g., a third UE 104c) in the train 802 through a wireless backhaul with the first BS 102a. The second BS 102b may be another example of a high mobility wireless device in the first coverage area 110a.

As an example, the second BS 102b may be a customer-premises equipment (CPE) deployed on a HST or another high speed vehicle to provide localized wireless coverage to passengers, for example, using a 5G NR link as the backhaul. The CPE may be a TRP deployed on a high mobility vehicle such as a HST or automobile, where the TRP has a wireless communication link with a base station for the backhaul. The CPE may support the higher receiver complexity for hybrid demodulation. The CPE may operate at high data rates (e.g., high modulation and coding schemes) to facilitate desirable performance for the OTFS component in the Doppler spreading channel.

The first BS 102a may multiplex the OTFS-modulated information (e.g., data or control signaling for the high mobility devices) with other information (e.g., data or control signaling for static (stationary) or low mobility devices) in an OFDM resource grid, for example, as described herein with respect to FIGS. 4-7. In this case, the first information may be for the high mobility devices, such as the second UE 104b and/or the second BS 102b, and the second information may be for the low mobility or static devices, such as the first UE 104a. It will be appreciated that other TRPs may provide overlapping coverage with the high mobility devices, which may result in a larger spread of Doppler shifts encountered at the high mobility devices.

For certain aspects, the hybrid OFDM described herein may be used for certain types of channels or signaling. For example, the OTFS component may be used for a control channel and/or control signaling, and the OFDM component may be used for a data channel and/or data signaling. The OTFS component may enable the control signaling to be decoded with a high accuracy in a channel with Doppler spreading. As the control signaling may use a small amount of bits (e.g., less than 128 bits for some downlink control information), the receiver complexity may be reduced to process the OTFS component.

Figure 9:
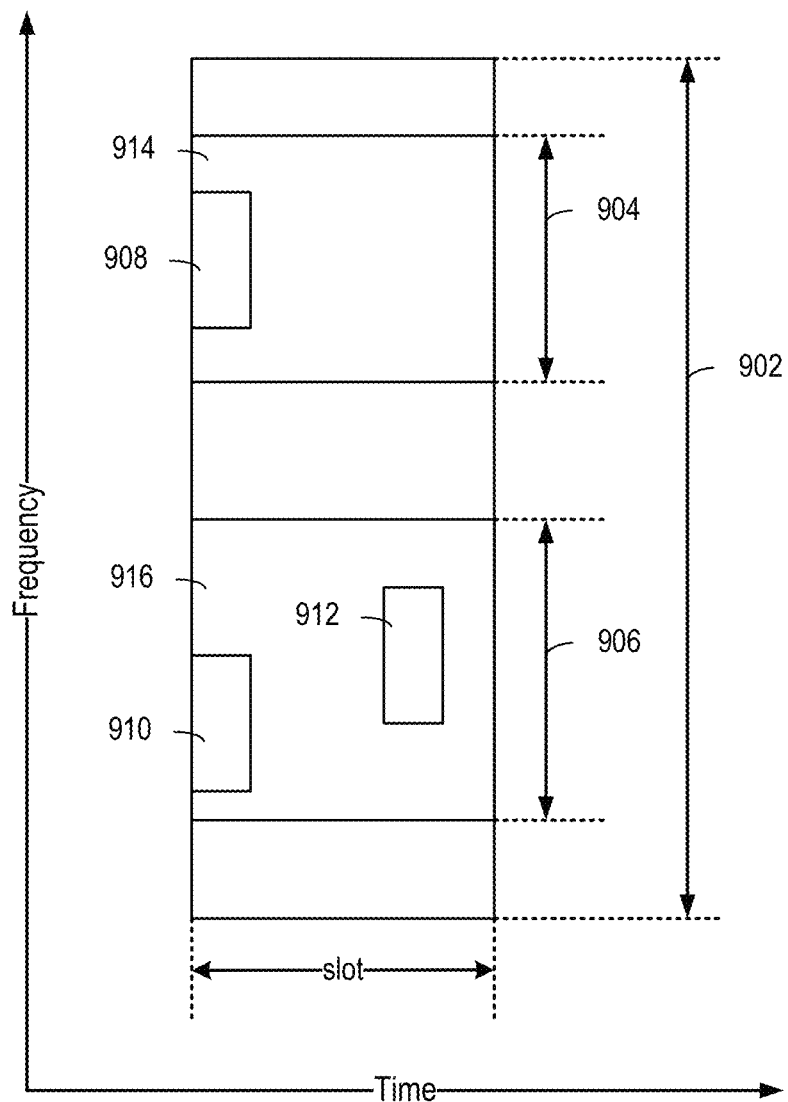
FIG. 9 is a diagram illustrating an example of different channels for a wireless communication network.

FIG. 9 is a diagram illustrating an example of different channels for a wireless communication network, such as wireless communication network 100 of FIG. 1. In certain wireless communication systems (e.g., LTE), a physical downlink control channel (PDCCH) is allocated across an entire system bandwidth, whereas in some wireless communication systems (e.g., NR systems), the PDCCH is transmitted in control resource sets (CORESETs) of an active bandwidth part (BWP). As shown, a carrier bandwidth (CBW) 902 may have multiple bandwidth parts (BWPs) 904, 906 at various subcarrier spacings (SCSs). In this example, the BWP 904 is configured with a single CORESET 908 and a physical downlink shared channel (PDSCH) 914, which may be used for data and/or control signaling. A BWP may be configured with multiple CORESETs. For example, the BWP 906 is configured with two CORESETs 910, 912 and a second PDSCH 916. For certain aspects, the OTFS component(s) may mapped to the CORESETs 908, 910, 912 (e.g., PDCCHs in NR), and the OFDM components may be mapped to the PDSCHs 914, 916, or vice versa.

Each of the CORESETs 908, 910, 912 may include a set of physical resources within a specific area in a downlink resource grid and are used, for example, to carry control signaling, such as downlink control information (DCI), system information, paging information, radio resource control (RRC) signaling, medium access control (MAC) signaling, and/or random access responses (RARs).

In certain aspects, a user equipment may transmit, to the network, capability information indicating that the user equipment is capable of performing the hybrid OFDM described herein. For example, referring to FIG. 8, the second UE 104b may transmit, to the first BS 102a, an indication that the second UE 104b is capable of decoding an OTFS payload, such as the first information described herein with respect to FIGS. 4-7.

It will be appreciated that the hybrid OFDM described herein may be applied to other types of selections for the OTFS component and OFDM component, such as quality of service priorities. For example, the OTFS component may be used for high priority services (e.g., video streaming), and the OFDM component may be used for low priority services (e.g., voice call).

Figure 10:
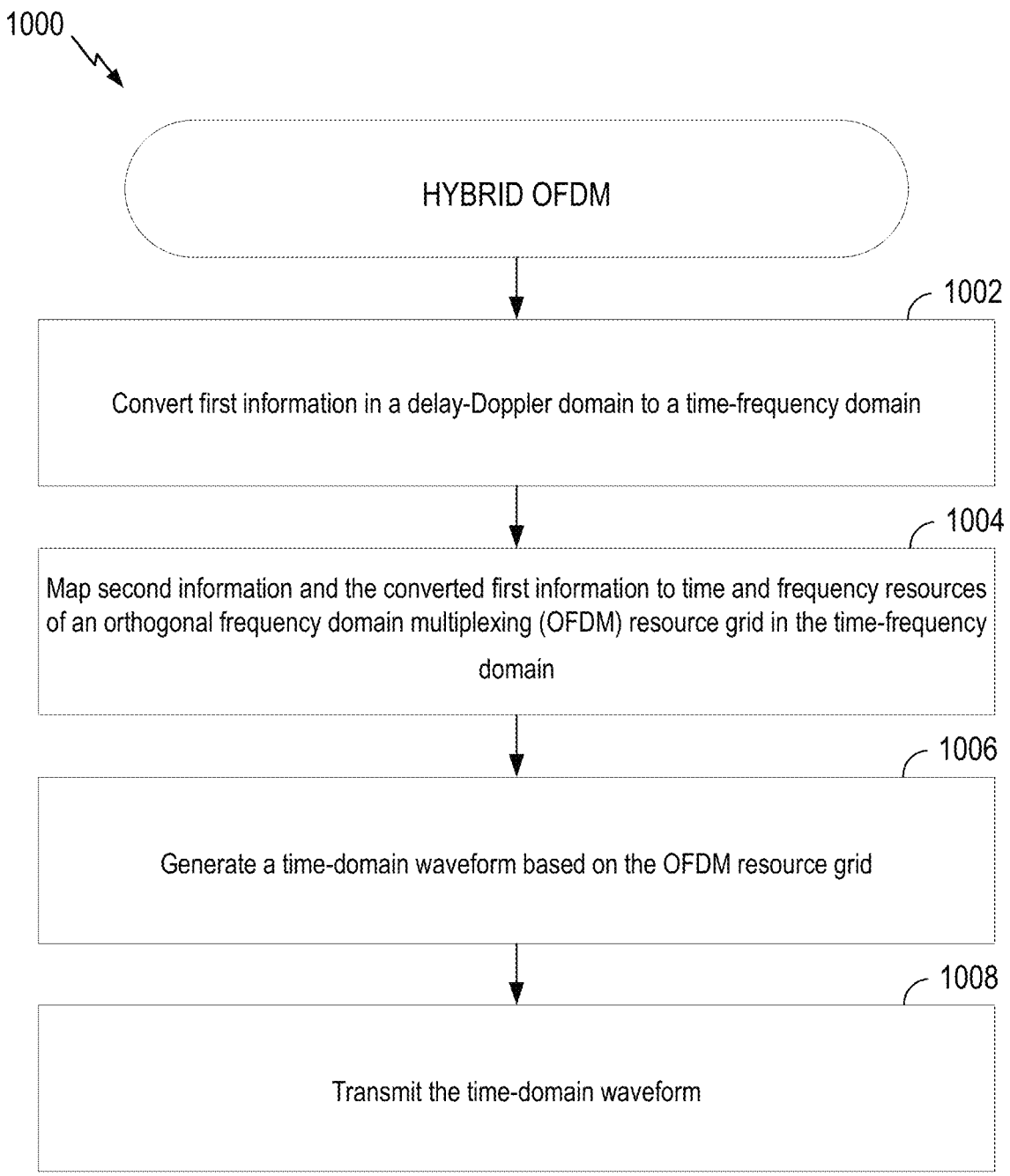
FIG. 10 depicts an example method for hybrid OFDM at a transmitter.

FIG. 10 depicts an example method 1000 for hybrid OFDM at a transmitter (e.g., the first BS 102a depicted in FIG. 8).

The method 1000 may optionally begin, at block 1002, where the transmitter may convert first information in a delay-Doppler domain to a time-frequency domain. For example, the transmitter may perform the OTFS precoding as described herein with respect to FIGS. 4 and 5. The transmitter may convert the first information using an OTFS modulation. The transmitter may convert the first information to the time-frequency domain using an ISFFT, for example, as described herein with respect to FIGS. 4 and 5.

At block 1004, the transmitter may map second information and the converted first information to time and frequency resources of an OFDM resource grid (e.g., the resource grid 604) in the time-frequency domain. For example, the transmitter may map the converted first information to a first set of time and frequency resources (e.g., the first set of time and frequency resources 606) and the second information to a second set of time and frequency resources (e.g., the second set of time and frequency resources 608).

At block 1006, the transmitter may generate a time-domain waveform based on the OFDM resource grid. For example, the transmitter may generate the time-domain waveform using an IFFT for OFDM modulation. The transmitter may apply an IFFT to the converted first information and the second information mapped to the OFDM resource grid.

At block 1008, the transmitter may transmit the time-domain waveform. For example, the transmitter may broadcast, multicast, or unicast the time-domain waveform to one or more wireless devices. The transmitter may transmit the time-domain waveform to one or more receiving entities (e.g., the second UE 104b and/or the second BS 102b depicted in FIG. 8). At the transmitter, the time-domain waveform may be a digital signal or an analog signal based on the digital signal.

For certain aspects, the hybrid OFDM described herein may be used for certain types of wireless devices, for example, as described herein with respect to FIG. 8. For example, the first information may be for a first type of wireless device, and the second information may be for a second type of wireless device. For certain aspects, the type of wireless device may be defined based on a mobility state associated with a wireless device or a Doppler effect (such as a degree of the Doppler effect or a range of Doppler effect) experienced by the wireless device. The first type of wireless device may have a different state of mobility than the second type of wireless device. As an example, the first wireless device may have a high state of mobility (such as the second UE 104b and/or the second BS 102b depicted in FIG. 8), whereas the second wireless device may have a low state of mobility of a static state (such as the first UE 104a depicted in FIG. 8). In some cases, the first type of wireless device may experience a greater Doppler shift (and/or Doppler spreading) than the second type of wireless device.

A state of mobility may be indicative of whether a wireless device is experiencing a particular mode or condition of mobility, such as a high mobility state, low mobility state, or a static state. A state of mobility may correspond to a specific range of velocities of a wireless device, a specific range of Doppler shifts experienced by the wireless device, and/or a specific range of Doppler spreading experience by the wireless device. In some cases, a high state of mobility may correspond to a wireless device that reaches velocities of 300 kilometers per hour (km/h) to 500 km/h. In certain aspects, the terms high state of mobility and low state of mobility may be relative to one another in one or more coverage areas and/or one or more wireless networks. For example, wireless devices with a high state of mobility may include wireless devices moving at a greater speed or velocity (or with a greater Doppler shift and/or Doppler spreading) compared to other wireless devices in a coverage area or wireless communication network. Wireless devices with a low state of mobility may include wireless devices moving at a lower speed or velocity (or with a lower Doppler shift and/or Doppler spreading) compared to other wireless devices in a coverage area or wireless communication network.

For certain aspects, the hybrid OFDM described herein may be used for certain types of signaling or channels, for example, as described herein with respect to FIG. 9. For example, the first information may be for a first type of channel (or signaling), and the second information may be for a second type of channel (or signaling). In some cases, the first type of channel is a control channel (e.g., a CORESET and/or PDCCH as depicted in FIG. 9), and the second type of channel is a data channel or a shared data and control channel (e.g., a PDSCH as depicted in FIG. 9).

In certain aspects, the mapping of the converted first information in the OFDM resource grid may use certain resource arrangements for the converted first information, for example, as described herein with respect to FIGS. 6 and 7. Such resource arrangements may be configured according to resource configurations (e.g., radio resource control configurations) and/or resource scheduling (e.g., DCI scheduling). The converted first information may occupy a predefined portion of the OFDM resource grid, and the second information may occupy another portion of the OFDM resource grid. For example, the predefined portion of the OFDM resource grid may correspond to a resource allocation or setting of a certain number of frequency resources (e.g., subcarriers or resource blocks) and/or a certain number of time resources (e.g., symbols).

The transmitter may map the converted first information to continuous frequency resources and discontinuous time resources (e.g., the resources 614 with a gap in time between consecutive resources). In some cases, the transmitter may map the converted first information to the discontinuous time resources with a same time gap (e.g., a gap of one or more symbols) between the time resources for the converted first information. In certain cases, the transmitter may map the converted first information to continuous time resources, for example, as illustrated in the arrangement 612c.

For certain aspects, a guard band in the frequency domain may be used between the resources for the first information and the second information, for example, as described herein with respect to FIG. 7. The transmitter may map the converted first information and the second information with a guard band in the frequency domain between the time and frequency resources for the converted first information and the second information.

Figure 11:
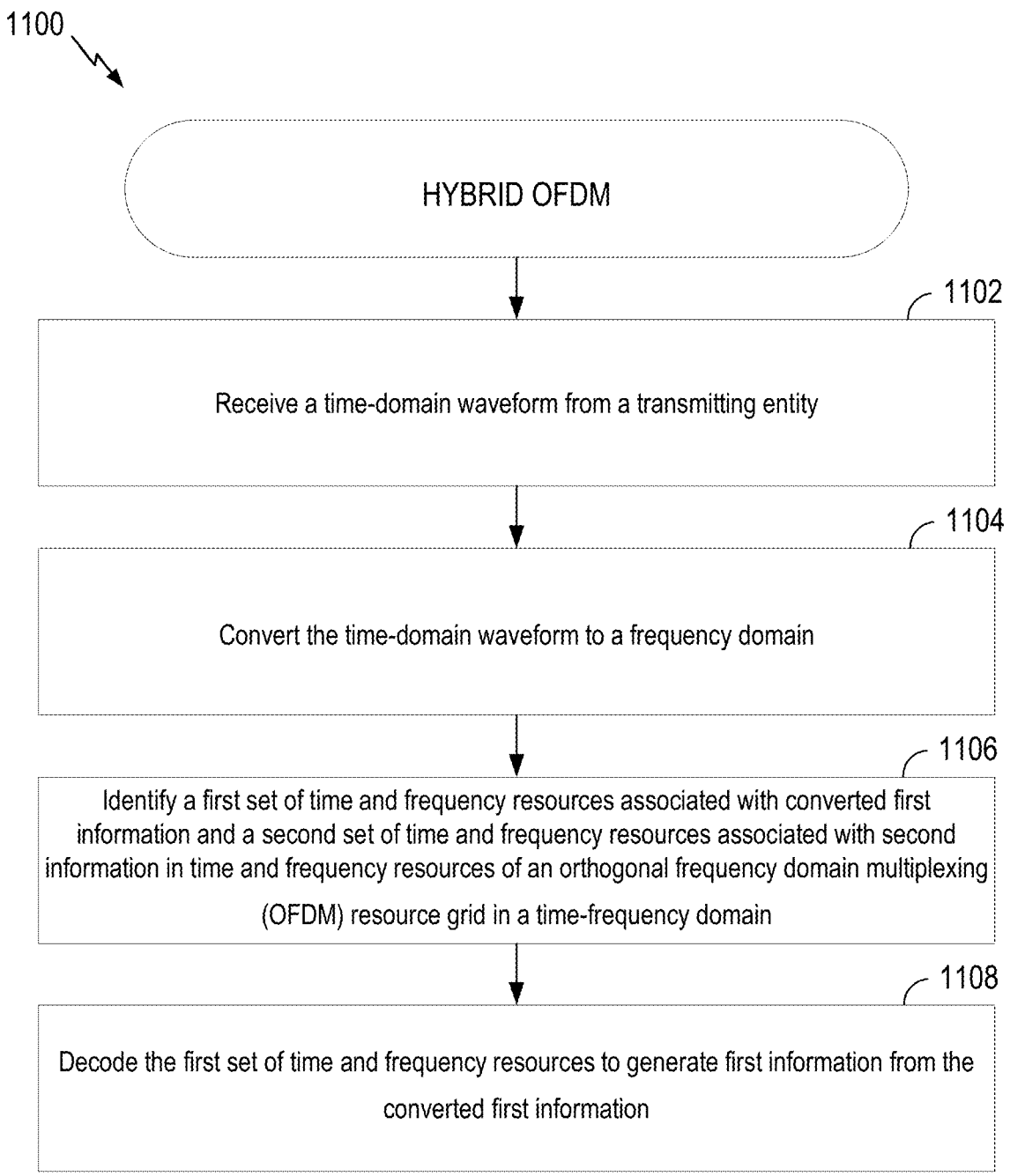
FIG. 11 depicts an example method for hybrid OFDM at a receiver.

FIG. 11 depicts an example method 1100 for hybrid OFDM at a receiver (e.g., the second UE 104b and/or the second BS 102b depicted in FIG. 8). The method 1100 may be complementary to the method 1000 performed by the transmitter.

The method 1100 may optionally begin, at block 1102, where the receiver may receive a time-domain waveform from a transmitting entity (e.g., the first BS 102a depicted in FIG. 8). For example, the receiver may receive a signal carrying data and/or control information from a base station, where the signal is modulated using the hybrid OFDM described herein. At the receiver, the time-domain waveform may be a digitized and/or processed (e.g., downconverted, filtered, etc.) signal based on a received analog signal.

At block 1104, the receiver may convert the time-domain waveform to a frequency domain. For example, the receiver may perform OFDM demodulation with a FFT as described herein with respect to FIG. 4.

At block 1106, the receiver may identify a first set of time and frequency resources (e.g., the first set of time and frequency resources 606) associated with converted first information (e.g., the converted first information in FIG. 6) and a second set of time and frequency resources (e.g., the second set of time and frequency resources 608) associated with second information (e.g., the second information in FIG. 6) in time and frequency resources of an OFDM resource grid (e.g., the OFDM resource grid 604) in a time-frequency domain. In certain aspects, the identification at step 1106 may be on a symbol-by-symbol basis for the second set of time and frequency resources, whereas the identification at 1106 may be for all of the first set of time and frequency resources for the first information.

At block 1108, the receiver may decode the first set of time and frequency resources to generate first information (e.g., the decoded first information in FIG. 4) from the converted first information. The converted first information may be the first information precoded with an OTFS modulation. For example, the receiver may decode the converted first information using a SFFT. The receiver may further applying a joint equalizer on the converted first information, for example, as described herein with respect to FIG. 4.

For certain aspects, the hybrid OFDM described herein may be used for certain types of wireless devices, for example, as described herein with respect to FIG. 8. For example, the first information may be for a first type of wireless device, and the second information may be for a second type of wireless device. The first type of wireless device may have a different state of mobility than the second type of wireless device. As an example, the first wireless device may have a high state of mobility (such as the second UE 104b and/or the second BS 102b depicted in FIG. 8), whereas the second wireless device may have a low state of mobility of a static state (such as the first UE 104a depicted in FIG. 8). In some cases, the first type of wireless device may experience a greater Doppler shift and/or Doppler spreading than the second type of wireless device.

For certain aspects, the hybrid OFDM described herein may be used for certain types of signaling or channels, for example, as described herein with respect to FIG. 9. For example, the first information may be for a first type of channel (or signaling), and the second information may be for a second type of channel (or signaling). In some cases, the first type of channel is a control channel (e.g., a CORESET and/or PDCCH as depicted in FIG. 9), and the second type of channel is a data channel or a shared data and control channel (e.g., a PDSCH as depicted in FIG. 9).

In certain aspects, the first set of time and frequency resources may use certain resource arrangements for the converted first information, for example, as described herein with respect to FIGS. 6 and 7. The converted first information may occupy a predefined portion of the OFDM resource grid, for example, according to a resource configuration and/or resource scheduling received from the transmitting entity.

The first set of time and frequency resources may include continuous frequency resources and discontinuous time resources, such as the resources 614 with a time gap between consecutive resources. The discontinuous time resources may have the same time gap (e.g., one or more symbols) between the first set of time and frequency resources associated with the converted first information. In some cases, the first set of time and frequency resources may include continuous time resources, such as in the arrangement 612c.

For certain aspects, a guard band in the frequency domain may be used between the resources for the first information and the second information, for example, as described herein with respect to FIG. 7. A guard band in the frequency domain may be arranged between the first set of time and frequency resources and the second set of time and frequency resource in the time and frequency resources.

Example Wireless Communication Devices

Figure 12:
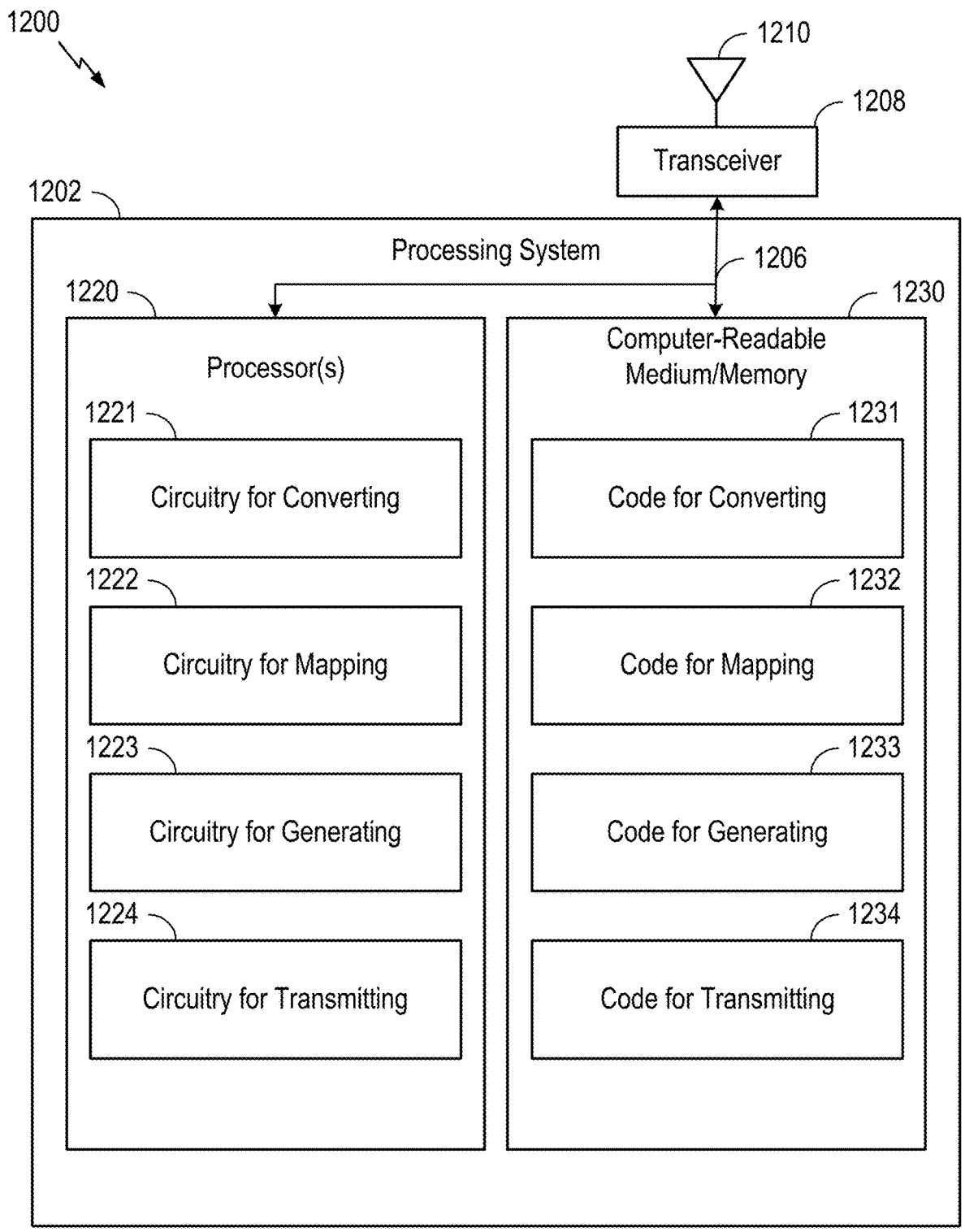
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 4-10. In some examples, communications device 1200 may be a BS 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 4-10, or other operations for performing the various techniques discussed herein for hybrid OFDM.

In the depicted example, computer-readable medium/memory 1230 stores code 1231 for converting, code 1232 for mapping, code 1233 for generating, and/or code 1234 for transmitting.

In the depicted example, the one or more processors 1220 include circuitry configured to implement the code stored in the computer-readable medium/memory 1230, including circuitry 1221 for converting, circuitry 1222 for mapping, circuitry 1223 for generating, and/or circuitry 1224 for transmitting.

Various components of communications device 1200 may provide means for performing the methods described herein, including with respect to FIGS. 4-10.

In some examples, means for transmitting or sending (or means for outputting for transmission) may include the transceivers 232 and/or antenna(s) 234 of the BS 102 illustrated in FIG. 2 and/or transceiver 1208 and antenna 1210 of the communications device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communications device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for converting, means for mapping, and/or means for generating may include various processing system components, such as: the one or more processors 1220 in FIG. 12, or aspects of the BS 102 depicted in FIG. 2, including receive processor 238, transmit processor 220, TX MIMO processor 230, and/or controller/processor 240 (including the hybrid OFDM component 241).

Notably, FIG. 12 is an example, and many other examples and configurations of communications device 1200 are possible.

Figure 13:
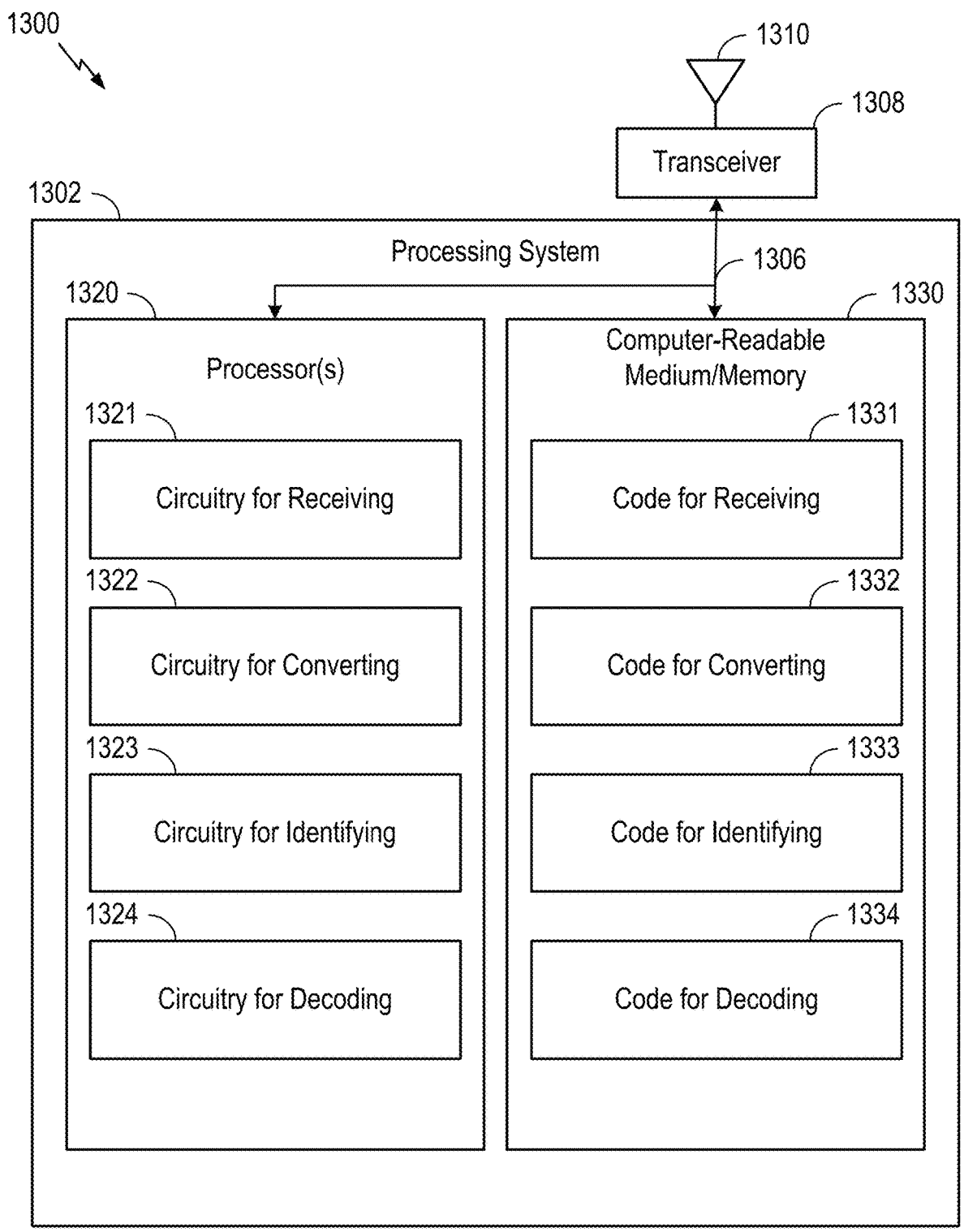
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 4-9 and 11. In some examples, communications device 1300 may be a UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 4-9 and 11, or other operations for performing the various techniques discussed herein for hybrid OFDM.

In the depicted example, computer-readable medium/memory 1330 stores code 1331 for receiving, code 1332 for converting, code 1333 for identifying, and/or code 1334 for decoding.

In the depicted example, the one or more processors 1320 include circuitry configured to implement the code stored in the computer-readable medium/memory 1330, including circuitry 1321 for receiving, circuitry 1322 for converting, circuitry 1323 for identifying, and/or circuitry 1324 for decoding.

Various components of communications device 1300 may provide means for performing the methods described herein, including with respect to FIGS. 4-9 and 11.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communications device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communications device 1300 in FIG. 13.

In some examples, means for converting, means for identifying, and/or means for decoding may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including the hybrid OFDM component 281).

Notably, FIG. 13 is an example, and many other examples and configurations of communications device 1300 are possible.

Example Clauses

Implementation examples are described in the following numbered clauses:

Clause 1: A method of wireless communication by a transmitter, comprising: converting first information in a delay-Doppler domain to a time-frequency domain; mapping second information and the converted first information to time and frequency resources of an orthogonal frequency domain multiplexing (OFDM) resource grid in the time-frequency domain; generating a time-domain waveform based on the OFDM resource grid; and transmitting the time-domain waveform.

Clause 2: The method of Clause 1, wherein the converted first information occupies a predefined portion of the OFDM resource grid, and wherein the second information occupies another portion of the OFDM resource grid.

Clause 3: The method of Clause 1 or 2, wherein converting the first information comprises converting the first information using an orthogonal time frequency space (OTFS) modulation.

Clause 4: The method according to any of Clauses 1-3, wherein the first information is for a first type of wireless device and the second information is for a second type of wireless device.

Clause 5: The method of Clause 4, wherein the first type of wireless device has a different state of mobility than the second type of wireless device.

Clause 6: The method of Clause 4 or 5, wherein the first type of wireless device experiences a greater Doppler shift than the second type of wireless device.

Clause 7: The method according to any of Clauses 1-6, wherein the first information is for a first type of channel and the second information is for a second type of channel.

Clause 8: The method of Clause 7, wherein the first type of channel is a control channel and the second type of channel is a data channel or a shared data and control channel.

Clause 9: The method according to any of Clauses 1-8, wherein mapping the second information and the converted first information comprises mapping the converted first information to continuous frequency resources and discontinuous time resources.

Clause 10: The method of Clause 9, wherein mapping the second information and the converted first information comprises mapping the converted first information to the discontinuous time resources with a same time gap between the discontinuous time resources for the converted first information.

Clause 11: The method according to any of Clauses 1-8, wherein mapping the second information and the converted first information comprises mapping the converted first information to continuous time resources.

Clause 12: The method according to any of Clauses 1-11, wherein mapping the second information and the converted first information comprises mapping the converted first information and the second information with a guard band in a frequency domain between the converted first information and the second information.

Clause 13: The method according to any of Clauses 1-12, wherein converting the first information comprises converting the first information to the time-frequency domain using an inverse symplectic finite Fourier transform (ISFFT).

Clause 14: The method according to any of Clauses 1-13, wherein generating the time-domain waveform comprises applying an inverse fast Fourier transform (IFFT) to the converted first information and the second information mapped to the OFDM resource grid.

Clause 15: A method of wireless communication by a receiver, comprising: receiving a time-domain waveform from a transmitting entity; converting the time-domain waveform to a frequency domain; identifying a first set of time and frequency resources associated with converted first information and a second set of time and frequency resources associated with second information in time and frequency resources of an orthogonal frequency domain multiplexing (OFDM) resource grid in a time-frequency domain; and decoding the first set of time and frequency resources to generate first information from the converted first information.

Clause 16: The method of Clause 15, wherein the converted first information occupies a predefined portion of the OFDM resource grid.

Clause 17: The method of Clause 15 or 16, wherein the converted first information is the first information precoded with an orthogonal time frequency space (OTFS) modulation.

Clause 18: The method according to any of Clauses 15-17, wherein: the first information is for a first type of wireless device; and the second information is for a second type of wireless device.

Clause 19: The method of Clause 18, wherein the first type of wireless device has a different state of mobility than the second type of wireless device.

Clause 20: The method of Clause 18 or 19, wherein the first type of wireless device experiences a greater Doppler shift than the second type of wireless device.

Clause 21: The method according to any of Clauses 15-21, wherein: the first information is for a first type of channel; and the second information is for a second type of channel.

Clause 22: The method of Clause 21, wherein: the first type of channel is a control channel; and the second type of channel is a data channel or a shared data and control channel.

Clause 23: The method according to any of Clauses 15-22, wherein the first set of time and frequency resources includes continuous frequency resources and discontinuous time resources.

Clause 24: The method of Clause 23, wherein the discontinuous time resources have a same time gap between the first set of time and frequency resources associated with the converted first information.

Clause 25: The method according to any of Clauses 15-22, wherein the first set of time and frequency resources includes continuous time resources.

Clause 26: The method according to any of Clauses 15-25, wherein a guard band in a frequency domain is between the first set of time and frequency resources and the second set of time and frequency resource in the time and frequency resources.

Clause 27: The method according to any of Clauses 15-26, wherein decoding the converted first information comprises decoding the converted first information using a symplectic finite Fourier transform (SFFT).

Clause 28: The method according to any of Clauses 15-27, further comprising applying a joint equalizer on the converted first information.

Clause 29: An apparatus comprising a memory comprising executable instructions and one or more processors configured to execute the executable instructions and cause the apparatus to perform a method in accordance with any of Clauses 1-28.

Clause 30: An apparatus comprising means for performing a method in accordance with any of Clauses 1-28.

Clause 31: A non-transitory computer-readable medium storing code that, when executed by one or more processors of an apparatus, cause the apparatus to perform a method in accordance with any of Clauses 1-28.

Clause 32: A computer program product embodied on a computer-readable storage medium comprising code for performing a method in accordance with any of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a closed subscriber group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of modulation and demodulation in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (random access memory), flash memory, ROM (read-only memory), PROM (programmable read-only memory), EPROM (erasable programmable read-only memory), EEPROM (electrically erasable programmable read-only memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
one or more memories comprising processor-readable instructions; and
one or more processors coupled to the one or more memories, the one or more processors configured to execute the processor-readable instructions and cause the apparatus to:
convert first information in a delay-Doppler domain to a time-frequency domain;
map second information and the converted first information to time and frequency resources of an orthogonal frequency domain multiplexing (OFDM) resource grid in the time-frequency domain;
generate a time-domain waveform based on the OFDM resource grid; and
transmit the time-domain waveform,
wherein:
the first information is for a first type of wireless device and the second information is for a second type of wireless device, and the first type of wireless device has a different state of mobility than the second type of wireless device or the first type of wireless device experiences a greater Doppler shift than the second type of wireless device; or
the first information is for a first type of channel and the second information is for a second type of channel.

2. The apparatus of claim 1, wherein the converted first information occupies a predefined portion of the OFDM resource grid, and wherein the second information occupies another portion of the OFDM resource grid.

3. The apparatus of claim 1, wherein converting the first information comprises converting the first information using an orthogonal time frequency space (OTFS) modulation.

4. The apparatus of claim 1, wherein the first information is for the first type of wireless device and the second information is for the second type of wireless device, and wherein the first type of wireless device has the different state of mobility than the second type of wireless device or the first type of wireless device experiences the greater Doppler shift than the second type of wireless device.

5. The apparatus of claim 4, wherein the first type of wireless device has the different state of mobility than the second type of wireless device.

6. The apparatus of claim 4, wherein the first type of wireless device experiences the greater Doppler shift than the second type of wireless device.

7. The apparatus of claim 1, wherein the first information is for a first type of channel and the second information is for a second type of channel.

8. The apparatus of claim 7, wherein the first type of channel is a control channel and the second type of channel is a data channel or a shared data and control channel.

9. An apparatus for wireless communication, comprising:
one or more memories comprising processor-readable instructions; and
one or more processors coupled to the one or more memories, the one or more processors configured to execute the processor-readable instructions and cause the apparatus to:
convert first information in a delay-Doppler domain to a time-frequency domain;
map second information and the converted first information to time and frequency resources of an orthogonal frequency domain multiplexing (OFDM) resource grid in the time-frequency domain;
generate a time-domain waveform based on the OFDM resource grid; and
transmit the time-domain waveform,
wherein to map the second information and the converted first information, the one or more processors are configured to execute the processor-readable instructions and cause the apparatus to map the converted first information to continuous frequency resources and discontinuous time resources, and
wherein to map the converted first information to the discontinuous time resources, the one or more processors are configured to execute the processor-readable instructions and cause the apparatus to map the converted first information to the discontinuous time resources with a same time gap between the discontinuous time resources for the converted first information.

10. The apparatus The method of claim 1, wherein to map the second information and the converted first information, the one or more processors are configured to execute the processor-readable instructions and cause the apparatus to map the converted first information to continuous time resources.

11. The apparatus of claim 1, wherein to map the second information and the converted first information, the one or more processors are configured to execute the processor-readable instructions and cause the apparatus to map the converted first information and the second information with a guard band in a frequency domain between the converted first information and the second information.

12. The apparatus of claim 1, wherein to convert the first information, the one or more processors are configured to execute the processor-readable instructions and cause the apparatus to convert the first information to the time-frequency domain using an inverse symplectic finite Fourier transform (ISFFT).

13. The apparatus of claim 1, wherein to generate the time-domain waveform, the one or more processors are configured to execute the processor-readable instructions and cause the apparatus to apply an inverse fast Fourier transform (IFFT) to the converted first information and the second information mapped to the OFDM resource grid.

14. An apparatus for wireless communication, comprising:
one or more memories comprising processor-readable instructions; and
one or more processors coupled to the one or more memories, the one or more processors configured to execute the processor-readable instructions and cause the apparatus to:
receive a time-domain waveform from a transmitting entity;
convert the time-domain waveform to a frequency domain;
identify a first set of time and frequency resources associated with converted first information and a second set of time and frequency resources associated with second information in time and frequency resources of an orthogonal frequency domain multiplexing (OFDM) resource grid in a time-frequency domain; and
decode the first set of time and frequency resources to generate first information from the converted first information,
wherein:
the first information is for a first type of wireless device, the second information is for a second type of wireless device, and the first type of wireless device has a different state of mobility than the second type of wireless device or the first type of wireless device experiences a greater Doppler shift than the second type of wireless device; or
the first information is for a first type of channel and the second information is for a second type of channel.

15. The apparatus of claim 14, wherein the converted first information occupies a predefined portion of the OFDM resource grid.

16. The apparatus of claim 14, wherein the converted first information is the first information precoded with an orthogonal time frequency space (OTFS) modulation.

17. The apparatus of claim 14, wherein:
the first information is for the first type of wireless device;
the second information is for the second type of wireless device; and
the first type of wireless device has the different state of mobility than the second type of wireless device or the first type of wireless device experiences the greater Doppler shift than the second type of wireless device.

18. The apparatus of claim 17, wherein the first type of wireless device has the different state of mobility than the second type of wireless device.

19. The apparatus of claim 17, wherein the first type of wireless device experiences the greater Doppler shift than the second type of wireless device.

20. The apparatus of claim 14, wherein:
the first information is for the first type of channel; and
the second information is for the second type of channel.

21. The apparatus method of claim 20, wherein:
the first type of channel is the control channel; and
the second type of channel is the data channel or the shared data and control channel.

22. An apparatus for wireless communication, comprising:
one or more memories comprising processor-readable instructions; and
one or more processors coupled to the one or more memories, the one or more processors configured to execute the processor-readable instructions and cause the apparatus to:
receive a time-domain waveform from a transmitting entity:
convert the time-domain waveform to a frequency domain;
identify a first set of time and frequency resources associated with converted first information and a second set of time and frequency resources associated with second information in time and frequency resources of an orthogonal frequency domain multiplexing (OFDM) resource grid in a time-frequency domain; and
decode the first set of time and frequency resources to generate first information from the converted first information,
wherein the first set of time and frequency resources includes continuous frequency resources and discontinuous time resources, and
wherein the discontinuous time resources have a same time gap between the first set of time and frequency resources associated with the converted first information.

23. The apparatus of claim 14, wherein the first set of time and frequency resources includes continuous time resources.

24. The apparatus of claim 14, wherein a guard band in a frequency domain is between the first set of time and frequency resources and the second set of time and frequency resources in the time and frequency resources.

25. The apparatus of claim 14, wherein to decode the converted first information, the one or more processors are configured to execute the processor-readable instructions and cause the apparatus to decode the converted first information using a symplectic finite Fourier transform (SFFT).

26. The apparatus of claim 14, wherein the one or more processors are configured to execute the processor-readable instructions and cause the apparatus to apply a joint equalizer on the converted first information.

* * * * *